(12) United States Patent
Holmes

(10) Patent No.: US 8,324,745 B2
(45) Date of Patent: Dec. 4, 2012

(54) FREE-PISTON LINEAR ALTERNATOR SYSTEMS AND METHODS

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 371 days.

(21) Appl. No.: 12/504,387

(22) Filed: Jul. 16, 2009

(65) Prior Publication Data

US 2011/0012367 A1    Jan. 20, 2011

(51) Int. Cl.
*H02P 23/00* (2006.01)
*F02B 71/00* (2006.01)
(52) U.S. Cl. .................. 290/1 A; 290/1 R; 123/46 R
(58) Field of Classification Search .................. 290/1 A
See application file for complete search history.

(56) References Cited

U.S. PATENT DOCUMENTS

| | | | |
|---|---|---|---|
| 4,454,426 A * | 6/1984 | Benson | 290/1 R |
| 5,002,020 A * | 3/1991 | Kos | 123/46 E |
| 5,936,386 A * | 8/1999 | Heglund | 322/94 |
| 6,487,998 B1 * | 12/2002 | Masberg et al. | 123/192.1 |
| 7,318,506 B1 * | 1/2008 | Meic | 290/1 A |
| 7,804,269 B2 * | 9/2010 | Randall | 318/701 |
| 7,905,813 B2 * | 3/2011 | Edelson et al. | 477/110 |
| 2005/0257757 A1 * | 11/2005 | Kemper et al. | 123/46 E |
| 2006/0196456 A1 * | 9/2006 | Hallenbeck | 123/47 A |
| 2008/0105223 A1 * | 5/2008 | Kubes et al. | 123/56.1 |
| 2009/0322098 A1 * | 12/2009 | Cohen | 290/1 A |
| 2010/0033029 A1 * | 2/2010 | Torralba et al. | 310/12.15 |

FOREIGN PATENT DOCUMENTS

WO    WO 2008058688 A2 *    5/2008

OTHER PUBLICATIONS

T. J. E. Miller, Switched Reluctance Motors and Their Control, 1993, pp. 7-23, Magna Physics Publishing and Clarendon Press, Oxford, England.
Paul C. Krause and Oleg Wasynczuk, Electromechanical Motion Devices, 1989, pp. 32-38, McGraw-Hill Book Company, New York.

* cited by examiner

*Primary Examiner* — Joseph Waks
(74) *Attorney, Agent, or Firm* — Ingrassia Fisher & Lorenz, P.C.

(57) ABSTRACT

Methods and apparatus are provided for operating a free-piston linear alternator. The apparatus includes a linear machine having first and second coils wound around a path for a linearly-moving mass and a rotating machine having a rotating mass and third and fourth coils. The first coil is coupled to the third coil, and the second coil is coupled to the fourth coil, such that movement of the linearly-moving mass with respect to the first and second coils imparts a first magnetic field upon the rotating mass via the third and fourth coils. Further, movement of the rotating mass with respect to the third and fourth coils creates a second magnetic field upon the linearly-moving mass to position the linearly moving mass for combustion.

20 Claims, 4 Drawing Sheets

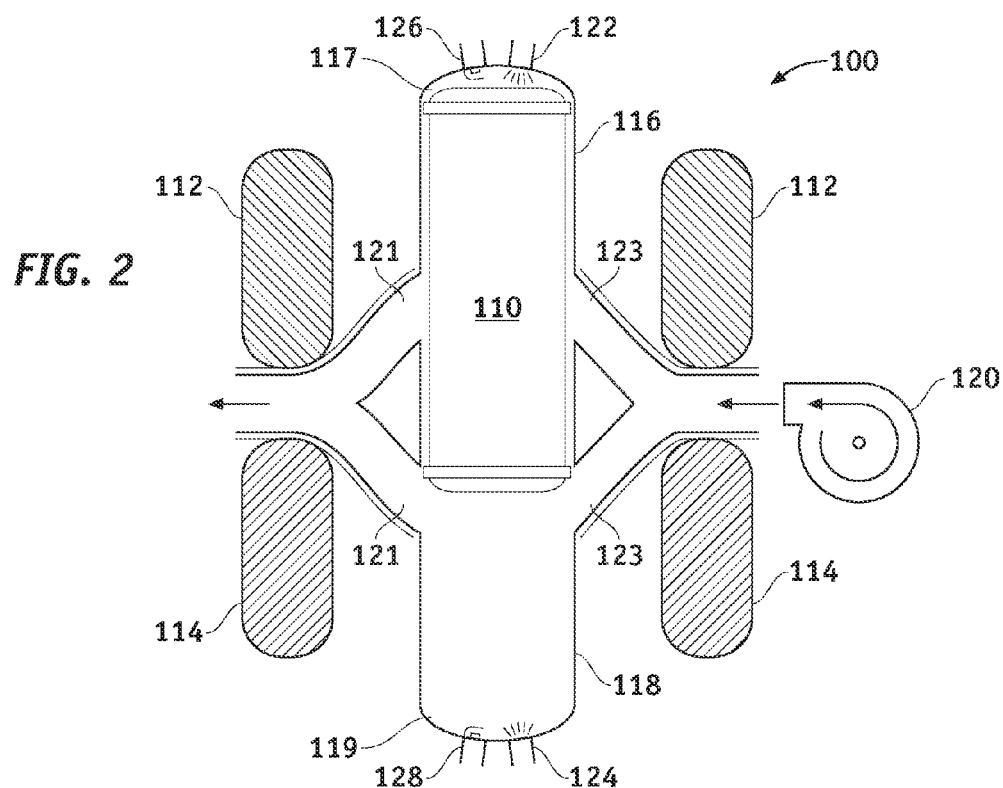
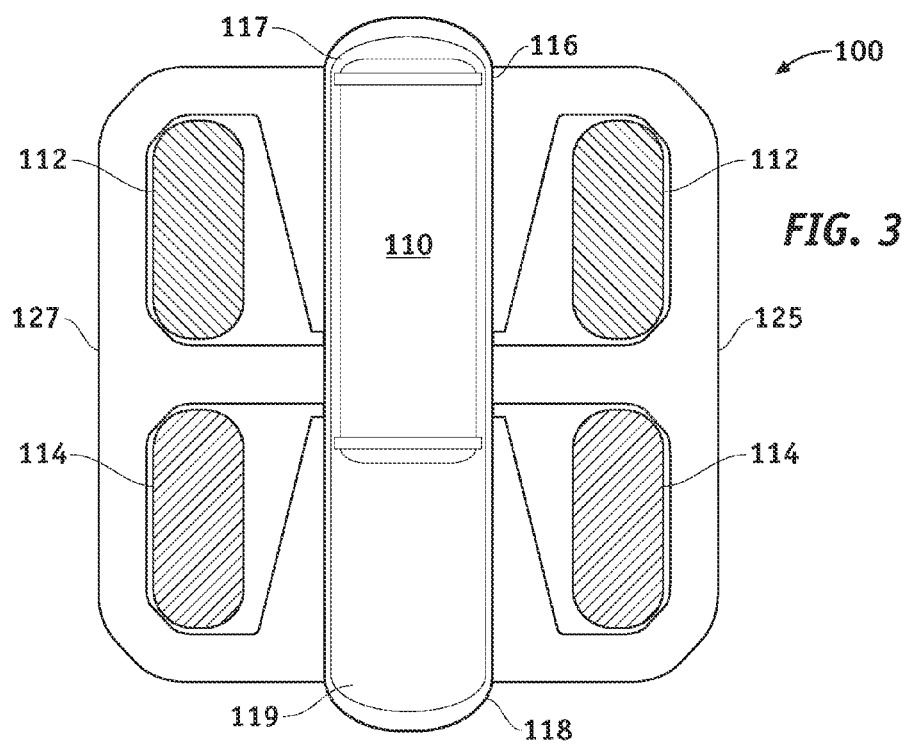

FREE-PISTON LINEAR ALTERNATOR SYSTEMS AND METHODS

TECHNICAL FIELD

This document generally relates to free-piston linear alternators, and more particularly relates to a free-piston linear alternator with windings coupled to a rotary motor.

BACKGROUND

Free-piston linear alternators have great potential for efficiency. A free-piston linear alternator typically is a linear machine with a piston that is not attached to a crank shaft, gears, or a fly wheel, but is free to move in the piston path. The piston in a linear alternator typically has a head at each end. Combustion at each end of the linear alternator carries the piston from one end of the piston path to the other end of the piston path and back again. Ideally each of the combustion reactions are alike and provide the force to move the piston into the right position at the right time for the next combustion reaction. In a typical linear alternator, however, there are some variations in the combustion reactions. If there is no compensation for the variations in each combustion reaction, the timing and compression of the piston will likely become continually worse, resulting in misfire and a halt to operation.

One solution provides compensation for variations in each combustion reaction using high-speed high-power switches to provide power to the coils in the free-piston linear alternator. This solution, however, is typically costly and generally requires complex controls to operate the switches.

Accordingly, it is desirable to provide a method and apparatus for operating a free-piston linear alternator to compensate for variations in combustion reactions or misfires. Furthermore, other desirable features and characteristics will become apparent from the subsequent detailed description and the appended claims, taken in conjunction with the accompanying drawings and the foregoing technical field and background.

SUMMARY

An apparatus is provided for driving a mechanical device. The apparatus comprises a linear machine having first and second coils wound around a path for a linearly-moving mass and a rotating machine having a rotating mass and third and fourth coils. The first coil is coupled to the third coil, and the second coil is coupled to the fourth coil, such that movement of the linearly-moving mass with respect to the first and second coils imparts a first magnetic field upon the rotating mass via the third and fourth coils. Further, movement of the rotating mass with respect to the third and fourth coils creates a second magnetic field upon the linearly-moving mass.

A method is provided for operating a free-piston linear alternator in a system including a linear machine comprising a first coil wound in proximity to a first combustion chamber, a second coil wound in proximity to a second combustion chamber, and a ferromagnetic mass configured to move between the first and second combustion chambers. The method comprises producing a linear movement in the ferromagnetic mass using a first combustion in the first combustion chamber and generating a first electrical current in the first coil from the linear movement of the ferromagnetic mass. The method further includes applying the first electrical current to produce inertia in a rotating mass and generating a second electrical current in the second coil from the inertia of the rotating mass. The second electrical current is applied to produce a magnetic field in the linear machine to position the ferromagnetic mass in the second combustion chamber for a second combustion.

DESCRIPTION OF THE DRAWINGS

A more complete understanding of the subject matter may be derived by referring to the detailed description and claims when considered in conjunction with the following figures, wherein like numerals denote like elements.

FIG. 2 is a cross sectional view of an exemplary linear machine;

FIG. 3 is a cross sectional view of the exemplary linear machine;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

An apparatus in an exemplary embodiment includes a free-piston linear alternator and a rotary motor that have connected windings. The free-piston linear alternator includes a double ended piston with a combustion chamber at each end of the piston to move the piston between the two combustion chambers using combustions. The movement of the piston produces a current in the windings that in turn produces movement of the rotary motor. The movement of the rotary motor also produces a current in the same windings that creates a magnetic field in the free-piston linear alternator. When combustion in the free-piston linear alternator varies from the ideal combustion, the magnetic field generated by the rotary motor assists in positioning the piston for the next combustion.

Figure 1:
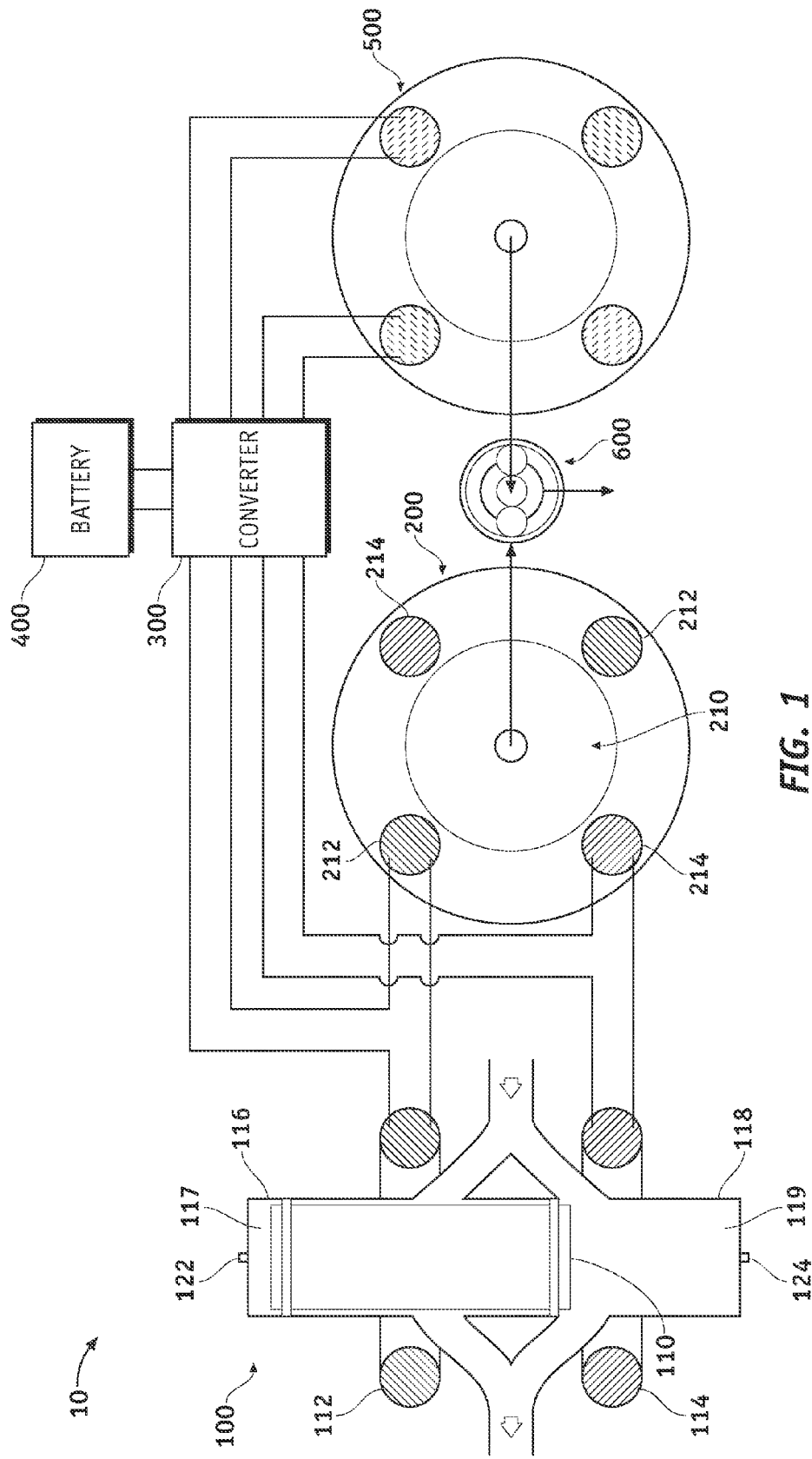
FIG. 1 is a simplified schematic diagram of an exemplary system for driving a mechanical device.

FIG. 1 is a block diagram of an exemplary system 10 for driving a mechanical apparatus. The exemplary system 10 includes a linear machine 100 with a linearly-moving mass 110. The linearly-moving mass 110 moves along a path between first end 116 with a first combustion chamber 117 having a first fuel source 122, and a second end 118 with a second combustion chamber 119 having a second fuel source 124. A first coil 112 is wound around the path for linearly-moving mass 110 and is positioned towards first end 116. Similarly a second coil 114 is also wound around the path and is positioned towards the second end 118.

First coil 112 and second coil 114 are configured to produce currents when linearly-moving mass 110 moves through the path. Such currents may be produced by the movement of a ferromagnetic mass through a coil by changes in reluctance and inductance. System 10 also includes a converter 300 coupled to first coil 112 and second coil 114 configured to convert the electrical current from operation of linear machine 100 into voltage or current with different electrical characteristics. In this embodiment converter 300 receives current from the coils and uses the current for charging a battery 400 and for driving a variable-speed motor 500. Converter 300 also receives power from battery 400 for starting exemplary system 10.

System 10 also includes a rotary machine 200 with a third coil 212 coupled to first coil 112. That is, in this embodiment the first coil 112 and the third coil 212 form a single continuous path for the flow of electrical current. Rotary machine 200 also has a fourth coil 214 coupled likewise to second coil 114. The currents produced by operation of linear machine 100 create electromagnetic fields in rotary machine 200 to move a rotor 210. Rotor 210 and variable-speed motor 5000 can be coupled to transmission 600 to drive transmission 600. Transmission 600 may be a power-split transmission that allows power to be combined at various levels of speed from two inputs, such as a planetary gear set, in which the output speed of a planet carrier is the average of the input speeds of a sun gear and a ring gear, weighted by the numbers of teeth on the sun gear and ring gear. In this example, rotary machine 200 operates at a speed determined by the frequency of the back-and-forth motion of the linearly-moving mass 110 regardless of the output speed demanded from transmission 600. Variable-speed motor 500 may then increase or decrease speed and/or torque as the output speed demand for transmission 600 increases and decreases. In the exemplary embodiment converter 300 drives variable-speed motor 500 at speeds independent of the cycling of linear machine 100 or rotary machine 200 using power from first and second coils 112 and 114, and the converter 300 may also use power from battery 400 or deliver power to the battery.

The cycles of linear machine 100 are linked to the cycles of rotary machine 200 because the coils in linear machine 100 are coupled to the coils in rotary machine 200. The cycle of the linear machine 100 includes a magnetic field that moves from first end 116 to second end 118 and back in relation to the movement of linearly-moving mass 110. Rotary machine 200 also has a magnetic cycle with a magnetic field vector that moves around rotary machine 200 in relation to the movement of rotating mass 210.

Under ideal conditions, precise and consistent combustions would occur in linear machine 100, causing rapid changes in the linear machine's magnetic field that in turn create currents in first and second coils (112 and 114). In this example the currents produced by combustion are used in multiple ways. First, the currents create changes in the magnetic field or movement of the magnetic field vector in rotary machine 200 thereby causing rotating mass 210 to rotate. Second, in this embodiment the energy from combustions is extracted from the coils as electrical energy, for example, by converter 300 operating variable-speed motor 500. Third, energy extracted from the coils is also used by converter 300 to charge battery 400. In other embodiments electrical energy from the currents may be used in other ways.

In a non-ideal condition where combustion does not take place or produces much less power than expected, inertia in rotating mass 210 causes rotating mass 210 to create currents in the coils. The currents from rotating mass 210 create a magnetic field in linear machine 100, thereby moving linearly-moving mass 110 into position for the next combustion, even though the previous combustion event was not sufficient to move the linearly-moving mass 110 into position.

To start system 10, converter 300 includes an internal switching device connected to battery 400 and to the coils of the linear alternator and the rotary motor. Converter 300 can provide an alternating electrical current through coils 112 and 212 and through coils 114 and 214. In this example linearly-moving mass 110 and rotating mass 210 will both try to follow this current, receiving power from the current and therefore from the switching device and battery 400. Once linear machine 100 begins to fire, it can become the leading device, supplying power to system 10, sustaining the electrical current, driving rotary machine 200, and supplying power to battery 400 through converter 300. If linear machine 100 misfires, the inertia in rotating mass 210 will cause rotary machine 200 to become the leading device, supplying power to system 10 so linearly-moving mass 110 will continue to cycle and will be in position to fire again.

The configuration for linear machine 100 and rotary machine 200 may be any suitable configuration. Linear machine 100 and/or rotary machine 200, for example, may be configured with or without permanent magnets in linearly-moving mass 110 or in rotating mass 210. Alternatively, linearly-moving mass 110 may be a ferromagnetic mass such as an iron slug, whose changing position with respect to coils 112 and 114 changes their inductance and may therefore be used to drive currents through them. The particular shape of electromagnets 125 and 127, which are shown as an example in FIG. 3, may be any suitable shape, and poles may be shaped in wedges or other shapes and configurations. Linear machine 100, in an exemplary embodiment shown in FIG. 2, has fuel injectors 122 and 124 and spark plugs 126 and 128 and provides air using a scavenging fan 120. In other embodiments, however, linear machine 100 may be any suitable non-rotary combustion motor and may provide fuel, air, and ignition in any suitable manner and may use a single combustion chamber or multiple combustion chambers or features such as scavenge pistons, valves, and so forth.

FIG. 2 shows a cross-sectional side view of an exemplary linear machine 100. The exemplary embodiment shown includes intake ports 121 and exhaust ports 123 which go partway around linear machine 100. In this embodiment a scavenging fan 120 is used to exchange air for each combustion cycle through intake ports 123 and exhaust ports 121. Fan 120 may be driven by rotating mass 210 (FIG. 1). FIG. 2 also shows a first ignition source 126 and a second ignition source 128 for igniting each of the combustions in linear machine 100.

FIG. 3 shows a cross-sectional view of linear machine 100 that is perpendicular to the cross-section of FIG. 2. Linear machine 100 may include electromagnets such as a first electromagnet 125 and a second electromagnet 127 which go partway around the linear machine 100. In this embodiment first coil 112 and second coil 114 are circular. Linearly-moving mass 110 and the path for linearly-moving mass 110 may also be circular. For each of the electromagnets 125 and 127, one of the electromagnet poles is in the center between first end 116 and second end 118, and is shared by the two coils. The other electromagnetic poles are wedge-shaped and extend along the path for linearly-moving mass 110 from first end 116 and second end 118. In other embodiments the poles extending from first end 116 and second end 118 may be other shapes or configurations such as rectangular poles with a substantially uniform width.

In the exemplary embodiment shown in FIG. 3, linearly-moving mass 110 is attracted toward first end 116 when current flows in first coil 112, until linearly-moving mass 110 fully overlaps the uppermost two of the three poles of each of electromagnets 125 and 127, eventually reaching first end 116. FIGS. 2 and 3 show linearly-moving mass 110 in an end position in first end 116. In this position, the reluctance between the two uppermost poles is at a minimum and inductance of coil 112 is at a maximum, and the reluctance between the two lowermost poles is at a maximum and inductance of coil 114 is at a minimum.

Figure 4:
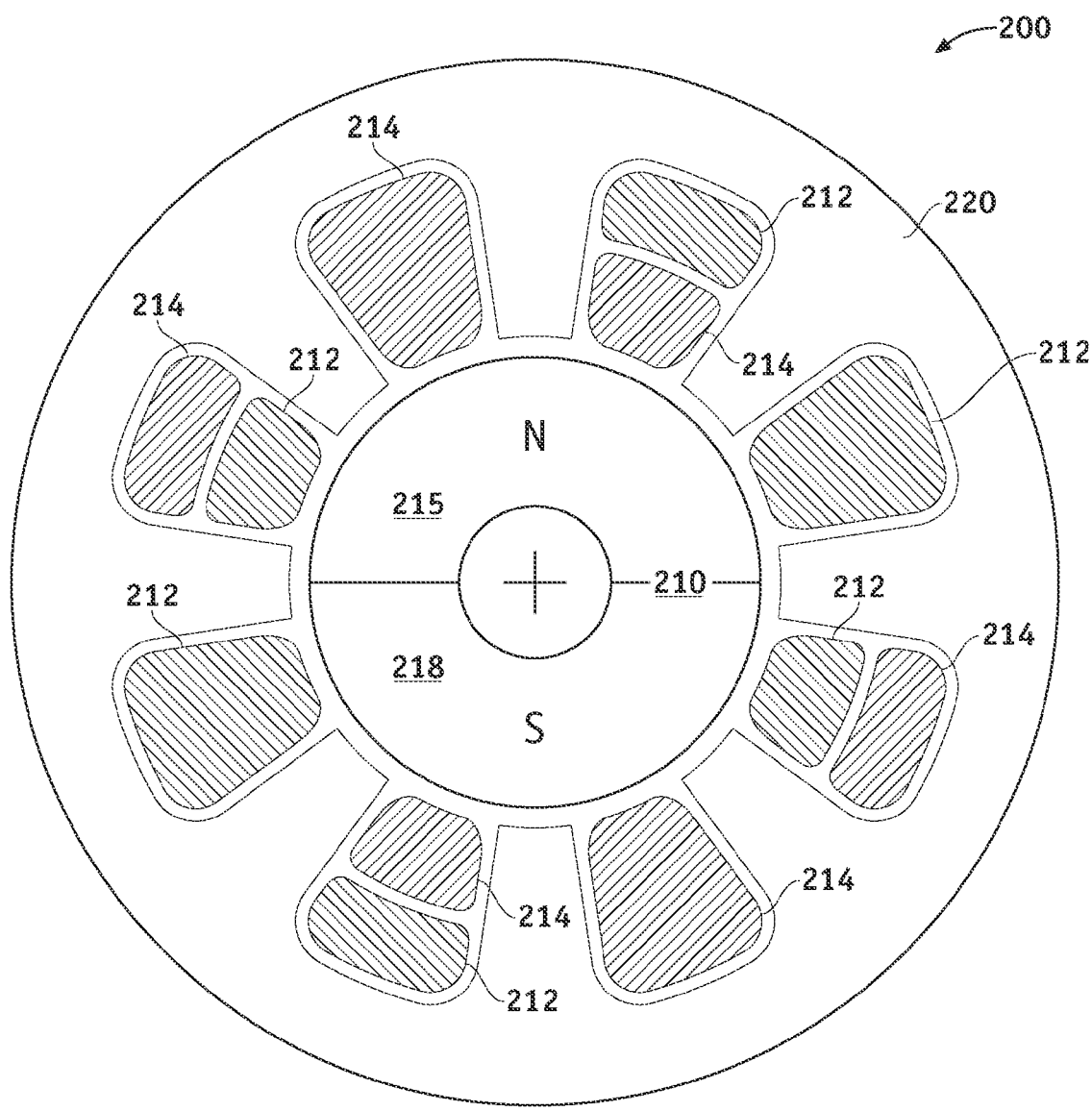
FIG. 4 is a cross sectional view of an exemplary rotary machine.

FIG. 4 shows a cross section view of rotary machine 200 with exemplary winding distributions of third coil 212 and fourth coil 214 inside a stator 220. Rotating mass 210 as shown in this figure has two magnetic poles 215 and 218, which are either north-seeking and south-seeking poles respectively, as in a permanent magnet motor, or a pair of ferromagnetic poles as in a reluctance motor. For the following discussion, rotary machine 200 is described as a synchronous motor where a rotating magnetic field vector is synchronized with the rotation of rotating mass 210. In other embodiments, however, rotary machine 200 may be a reluctance motor where the rotating magnetic field vector rotates at a different rate than rotating mass 210, such as in many examples of switched-reluctance motors. In the exemplary embodiment there are two electrical phases in rotary machine 200 with third and fourth coils (212 and 214) having orthogonal windings. As rotating mass 210 with its magnetic poles 215 and 218 rotates within stator 220, an electrical current is produced if rotating mass 210 is the leading part of exemplary system 10.

For the purpose of discussion, linear machine 100 and rotary machine 200 may be considered to be in equilibrium when they are in motion but are not exchanging power. Three parts of the system, linear machine 100, rotary machine 200, and currents in coils 112, 114, 214, and 216 (FIGS. 1 and 2) have equilibrium relationships in cycles. The relationships involve the movement of linearly-moving mass 110, movement of rotating mass 210, and cycles of the electrical currents flowing through the coils. In this example, when in equilibrium, linearly-moving mass 110 reaches first end 116 (shown in FIG. 4) just as the electrical current in first coil 112 peaks and the current in second coil 114 reaches its minimum magnitude. At the same time magnetic poles 215 and 218 align with third coil 212 of rotary machine 200. As the system operates in equilibrium, linearly-moving mass 110 reaches second end 118 just as the electric current in second coil 114 peaks and the current in first coil 112 reaches its minimum magnitude. In equilibrium, linearly-moving mass 110 also reaches second end 118 just as magnetic poles 215 and 218 in rotary machine 200 align with fourth coil 214 at right angles to third coil 212. In this example the rotating magnetic field in rotary machine 200 makes a quarter turn as linearly-moving mass 110 in linear machine 100 travels from first end 116 to second end 118. With this configuration, linear machine 200 cycles once (2 strokes) in half a turn of rotary machine 200 and linear machine 100 cycles twice (4 strokes) per revolution of the magnetic field and of rotating mass 210 in rotary machine 200.

In operation of the exemplary embodiment the components are not always at equilibrium, but are driven towards equilibrium. If linearly-moving mass 110, for example, falls behind or gets ahead of the electric current cycle, then the current in the coils tends to drive linearly-moving mass 110 back toward the equilibrium relationship. Likewise, if the rotation of rotating mass 210 falls behind or gets ahead of the rotation of the electric current cycle, then the current in the coils tends to drive rotating mass 210 back toward the equilibrium relationship. In this way, linearly-moving mass 110 and rotating mass 210 can add power to the current in the coils by getting ahead or can receive power from the currents in the coils by falling behind.

Figure 5:
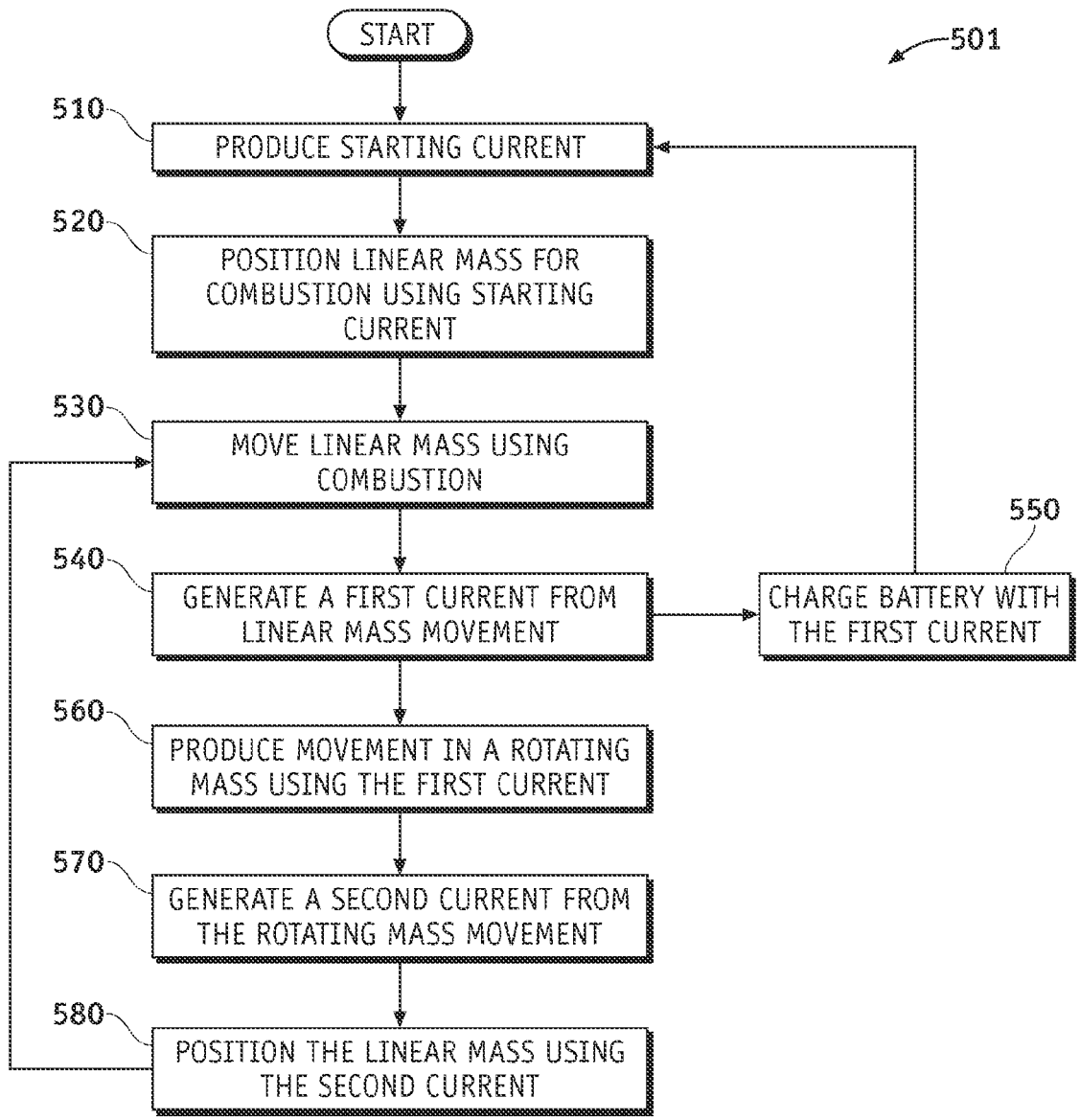
FIG. 5 is a flow chart of an exemplary method of operating a free-piston linear alternator.

Turning now to FIG. 5, an exemplary method 500 for operating a free-piston linear alternator suitably includes the broad functions of moving a linear mass using combustion (function 530), generating a first current from the linear mass movement (function 540), producing movement in a rotating mass using the first current (function 560), generating a second current from the rotating mass movement (function 570), and positioning the linear mass for another combustion using the second current (function 580). Other embodiments may additionally produce a starting current (function 510), position the linear mass for combustion using the starting current (function 520), and charge a battery with the first current (function 550). Various other functions and other features may also be provided, as described in increasing detail below.

In the exemplary embodiment, method 501 begins with converter 300 (FIG. 1) producing a starting current (function 510) using battery 400. The starting current is produced in the coils to creates magnetic fields that move linearly-moving mass 110 and rotating mass 210. The starting current is used to position linearly-moving mass 100 for combustion (function 520), for example in first combustion chamber 117. The exemplary starting current continues through multiple cycles to provide inertia in rotating mass 210. The starting current is used to produce proper conditions for a suitable combustion in first or second combustion chamber 117 or 119, such as suitable compression. Fuel is injected in the proper combustion chamber such as from first fuel source, and the fuel is ignited to move linearly-moving mass 110 using combustion (function 530).

In the exemplary embodiment linearly-moving mass 110 moves from first end 116 to second end 118 to generate a first current (function 540) as linearly-moving mass 110 passes first and second coils 112 and 114. First coil 112 is coupled to third coil 212 and second coil 114 is coupled to fourth coil 214 so that the first current produced by movement of linearly-moving mass 110 (function 540) produces further movement in rotating mass 210 (function 560). As discussed above, the rotating magnetic field in rotary machine 200 rotates 90 degrees while linearly-moving mass 110 moves from first end 116 to second end 118.

The movement of rotating mass 210 generates a second current in the coils (function 570). In this example the second current creates a magnetic field towards second end 118 that positions linearly-moving mass 110 (function 580) at the proper time for a second combustion in second combustion chamber 119. Combustion then takes place in second combustion chamber to move linearly-moving mass 110 (function 530), and current is again generated from the movement of linearly-moving mass 110 (function 540). A portion of the current from movement of linearly-moving mass 110 can be used to charge battery 400 (function 550). Power from battery 400 can then be used to produce the starting current (function 510) and for other operations.

While at least one exemplary embodiment has been presented in the foregoing detailed description, it should be appreciated that a vast number of variations exist. For example, rotating mass 210 may drive a transmission and therefore a vehicle by itself, or it may be part of a drive system containing another rotary motor such as variable-speed motor 500.

In one embodiment the linear machine 100 is described as primarily using one combustion event to position the linearly-moving mass 110 for the next combustion event, with the electrical current from rotary machine 200 influencing position of linearly-moving mass 110 when there are inconsistencies in the combustion events. In other embodiments, however, the magnetic field produced from the rotary machine's current is the primary force for positioning linearly-moving mass 110 for combustion events regardless of the combustion variations.

System 10 in the exemplary embodiment is used to drive a transmission. In other embodiments linear machine 100 and rotary motor 200 are used as a generator to produce electricity for use in various systems. Linear machine 100 and rotary motor 200, for example, may be implemented as a generator in a series-hybrid-electric vehicle, or as a power supply for a back-up power generation system or other power generator system.

Rotary machine 200 may be a synchronous motor or an asynchronous motor, with a rotating mass that rotates with the rotating magnetic field, or may have a rotating mass that rotates at a different rate from the magnetic field. The relationships between the cycles of the linear machine 100, rotary machine 200, and current are given by way of example based on an exemplary configuration. The relationships between cycles may change with different configurations. Other parts and configuration of system 10 may also be changed to use other suitable configurations.

It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An apparatus comprising:
    a battery;
    a linear machine having first and second coils wound around a path for a linearly-moving mass;
    a converter electrically connected between the battery and the first and second coils to selectively provide an alternating current to the first and second coils for generating a magnetic field by converting a direct current of the battery; and
    a rotating machine having a rotating mass and third and fourth coils, wherein the first coil is coupled to the third coil, and the second coil is coupled to the fourth coil, such that movement of the linearly-moving mass with respect to the first and second coils imparts a first magnetic field upon the rotating mass via the third and fourth coils, and such that movement of the rotating mass with respect to the third and fourth coils creates a second magnetic field upon the linearly-moving mass.

2. The apparatus according to claim 1 wherein the converter is configured to convert electrical current from a first frequency to a second frequency.

3. The apparatus according to claim 2 wherein the converter selectively provides energy to the battery from the first and second coils.

4. The apparatus according to claim 2 further comprising a variable speed motor coupled to the converter, wherein the first and second coils operate at the first frequency and the variable speed motor operates at the second frequency.

5. The apparatus according to claim 1 wherein the linear machine has a first end and a second end, wherein the first coil is wound in proximity to the first end and the second coil is wound in proximity to the second end, wherein the linear machine has a first combustion chamber at the first end and a second combustion chamber at the second end.

6. The apparatus according to claim 5 wherein the linearly-moving mass is a free piston with a first piston end that interacts with the first combustion chamber and a second piston end that interacts with the second combustion chamber.

7. The apparatus according to claim 1 wherein the linearly-moving mass includes a ferromagnetic material which interacts with the first and second coils.

8. The apparatus according to claim 1 wherein the linearly-moving mass includes a permanent magnet.

9. The apparatus according to claim 1 wherein the rotating machine is an induction motor.

10. The apparatus according to claim 1 further comprising a gear system coupled to the rotating machine and configured to convert rotational energy from the rotating machine to a second apparatus.

11. The apparatus according to claim 10 further comprising a variable speed motor coupled to the converter and to the gear system, wherein the gear system mechanically averages the shaft speeds of the rotating machine and the variable speed motor to obtain an output speed.

12. A system for driving a mechanical apparatus comprising:
    a battery;
    a linear machine having a linearly-moving mass that moves along a path having a first end and a second end, a first combustion chamber adjacent to the first end of the path, a first coil wound in proximity to the first end of the path, a second combustion chamber adjacent to the second end of the path, and a second coil wound in proximity to the second end of the path;
    a converter electrically connected between the battery and the first and second coils to selectively provide an alternating current to the first and second coils for generating a magnetic field by converting a direct current of the battery; and
    a rotating machine having a rotating mass with a first magnetic pole and a second magnetic pole, and a stator having a third coil and a fourth coil configured to create magnetic fields for moving the rotating mass, wherein the first coil is coupled to the third coil and the second coil is coupled to the fourth coil;
    wherein movement of the first and second poles in proximity to the third coil creates a first magnetic field using the first coil that positions the linearly-moving mass in the first combustion chamber, and wherein movement of the first and second poles in proximity to the fourth coil creates a second magnetic field using the second coil that positions the linearly-moving mass in the second combustion chamber.

13. The system according to claim 12 further comprising a gear system coupled to the rotating mass and configured to drive the mechanical apparatus.

14. The system according to claim 13
    wherein the converter is configured to produce an output current at variable frequencies and further comprising a variable speed motor coupled to the output from the converter and configured to operate at variable speeds related to the variable frequencies, wherein the variable speed motor is coupled to the gear system.

15. The system according to claim 12
    wherein the converter is configured to convert electrical current from the first and second coils to a DC voltage for storing energy in the battery.

16. A method of operating a system including a linear machine comprising a first coil wound in proximity to a first combustion chamber, a second coil wound in proximity to a second combustion chamber, and a ferromagnetic mass configured to move between the first and second combustion chambers, the method comprising:
    generating a magnetic field at the linear machine;

producing a linear movement in the ferromagnetic mass using a first combustion in the first combustion chamber;

generating a first electrical current in the first coil from the linear movement of the ferromagnetic mass;

applying the first electrical current to produce inertia in a rotating mass;

generating a second electrical current in the second coil from the inertia of the rotating mass; and applying the second electrical current to produce a magnetic field in the linear machine to position the ferromagnetic mass in the second combustion chamber for a second combustion.

17. The method according to claim 16, wherein the system includes a converter coupled to a battery and to the first and second coils, the method further comprising:

converting a portion of the first electrical current to DC voltage using the converter; and applying the DC voltage to the battery to store energy in the battery.

18. The method according to claim 17 further comprising:

applying stored energy from the battery to create a starting electrical current in the first and second coils; and applying the starting electrical current to produce a starting magnetic field in the linear machine to position the ferromagnetic mass in the first combustion chamber for the first combustion.

19. The method according to claims 16 further comprising:

starting the linear machine by providing an alternating current to the first coil and the second coil to create a rotating magnetic field to move the rotating mass, and to create a linear magnetic field in the linear machine to move the ferromagnetic mass relative to the first and second coils.

20. The method according to claim 16 further comprising:

driving a mechanical system using a portion of the inertia in the rotating mass.

\* \* \* \* \*